(12) United States Patent
Wood et al.

(10) Patent No.: US 6,393,590 B1
(45) Date of Patent: May 21, 2002

(54) METHOD AND APPARATUS FOR ENSURING PROPER FUNCTIONALITY OF A SHARED MEMORY, MULTIPROCESSOR SYSTEM

(75) Inventors: Barry Everett Wood; Brian Baker, both of Dunrobin (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/218,361

(22) Filed: Dec. 22, 1998

(51) Int. Cl.[7] ................................................ G06F 11/14
(52) U.S. Cl. ........................... 714/55; 710/15; 710/18; 710/58; 710/104; 713/1; 713/2; 714/4; 714/10; 714/22; 714/23
(58) Field of Search ....................... 710/58, 262, 266, 710/267, 104, 15, 18; 709/103, 233, 234; 714/4, 10, 12, 11, 55, 23, 22; 711/147; 712/35, 12, 244; 713/1, 2

(56) References Cited

U.S. PATENT DOCUMENTS

| | | | | |
|---|---|---|---|---|
| 4,502,116 A | * | 2/1985 | Fowler et al. ................... 714/4 |
| 4,642,756 A | * | 2/1987 | Sherrod ....................... 709/103 |
| 4,809,280 A | * | 2/1989 | Shonaka ....................... 714/55 |
| 5,113,523 A | * | 5/1992 | Colley et al. .................. 712/12 |
| 5,226,152 A | * | 7/1993 | Klug et al. .................... 714/12 |
| 5,333,285 A | * | 7/1994 | Drerup ........................ 714/23 |
| 5,408,643 A | * | 4/1995 | Katayose ...................... 714/55 |
| 5,438,666 A | * | 8/1995 | Craft et al. .................... 710/22 |
| 5,768,613 A | * | 6/1998 | Asghar ........................ 712/35 |
| 5,812,757 A | * | 9/1998 | Okamoto et al. .............. 714/11 |
| 5,815,651 A | * | 9/1998 | Litt ............................ 714/10 |
| 5,909,574 A | * | 6/1999 | Meyer ........................ 712/244 |
| 5,918,248 A | * | 6/1999 | Newell et al. ............... 711/147 |
| 6,141,692 A | * | 10/2000 | Loewenstein et al. ...... 709/234 |
| 6,185,662 B1 | * | 2/2001 | Sato ........................... 709/233 |
| 6,195,760 B1 | * | 2/2001 | Chung et al. .................. 714/4 |

* cited by examiner

*Primary Examiner*—Thomas Lee
*Assistant Examiner*—Tammara Peyton

(57) ABSTRACT

The present invention relates to a method and apparatus for ensuring fault detection and system recovery in a multiprocessor computing system. This system comprises a multitude of processing element modules, input/output processor modules and shared memory modules. Each module within the system includes an identical period sanity timer capable to reset the module once a predetermined limit count is reached. If a global clear signal is not received from the operating system scheduler by all modules prior to the expiry of the sanity timers, a system-wide reset is effected. Each processing element module within the system further includes a watchdog timer capable to reset the module once a predetermined limit count is reached. If a process is not run by the operating system scheduler on the processing element before the expiry of the watchdog timer, effectively clearing the watchdog timer, the processing element is reset and removed from service.

15 Claims, 3 Drawing Sheets

METHOD AND APPARATUS FOR ENSURING PROPER FUNCTIONALITY OF A SHARED MEMORY, MULTIPROCESSOR SYSTEM

FIELD OF THE INVENTION

The present invention relates to the field of multiprocessing. More specifically, it pertains to a method and apparatus for resetting a multiprocessor system and for ensuring that the system periodically demonstrates its proper functionality. The invention also extends to a novel processing element for use in a multiprocessing system and to a computer readable storage medium including a program element implementing an operating system that can verify the functionality of the processing element.

BACKGROUND OF THE INVENTION

Within the ever evolving world of computer systems, a particular change has arisen with respect to the design of better and faster systems. Originally, systems were implemented in a uni-processor environment, whereby a single Central Processing Unit (CPU), hereafter referred to as processor, was responsible for all computer performance, including computations and IO. Unfortunately, uni-processor designs have built-in bottlenecks, where the address and data buses restrict data transfer to a one-at-a-time trickle of traffic, and the system program counter forces instructions to be executed in strict sequence. Rather than designing better, faster uni-processor machines which will never fully overcome the bottleneck limitation, a different computer system design was realized in order to effect real improvements in computer performance, specifically the multiprocessor system The multiprocessing environment involves the use of more than one processor, also referred to as Processing Element (PE), where these processors share resources, such as IO channels, control units, files and devices. Within a particular computer system, these processors may be in a single machine sharing a single bus or connected by other topologies (e.g. crossbar, grid, ring), or they might be in several machines using message-passing across a network. An important capability of the multiprocessor operating system is its ability to withstand equipment failures in individual processors and to continue operation. Although there are different basic operating system organizations for multiprocessor systems, one example is symmetric multiprocessing, where all of the processors are functionally equivalent and can perform IO and computation. In this case, the operating system manages a pool of identical PEs, any one of which may be used to control any IO device or reference any storage unit. Note that the same process may be run at different times by any of the PEs.

One of the roles of an operating system in a multiprocessor system is to provide the ability for application code to be given some CPU time in a regular fashion. A running instance of application code is known as a process, and the operating system ensures that each process is provided with CPU time in accordance with the needs of the process, as well as the requirements of the multiprocessor system.

In the case of a running Digital Multiplexing Switch (DMS), the system can contain thousands of processes in various states of readiness. It is always possible that some interaction of processes, or some software or hardware fault, will disable the ability of the system to run processes. Such a situation is commonly referred to as Insanity. A mechanism known as Sanity testing is provided so that a running switch can monitor itself to ensure that it has not entered a state where processes are not being run in a fair way. In other words, Sanity tests the system to ensure that it continues to perform the minimal necessary functions which allow the switch to perform useful work.

Robust real time systems require a "heartbeat" mechanism which demonstrates that the system is functioning properly. Failure to demonstrate proper functionality must result in recovery actions that do not depend upon the proper functioning of the system. Additionally, the ability to reset the system for maintenance purposes must exist at all times. For a symmetric multiprocessor system, for example a switch, these capabilities must be provided in a completely distributed, robust manner, ensuring not only a system-wide sanity, but also a per PE sanity, in order to detect and correct the major sanity dangers in the running switch. Examples of these sanity dangers include:

A process has run for longer than the maximum allowable amount of time without allowing a context switch;

A PE has developed a hardware fault which does not allow software to run on that PE;

A PE has developed a hardware fault which does not allow the operating system to receive system critical interrupts (e.g. timer interrupts);

The operating system queues are corrupted so that no PE can run a process;

The software load has been corrupted such that no process can tun on any PE;

The software load can not be restarted on any PE.

In existing uniprocessor systems, two complete instances of hardware and software exist. The two system instances execute in lockstep, whereby both system instances perform the exact same task at the exact same time. Loss of lockstep indicates the detection of a hardware error. Maintenance software is invoked to diagnose, isolate and recover from the fault. Each system instance has one timer which has to be cleared periodically to demonstrate that the real time nature of the system is functional. Manual reset is provided by a duplicated sub-system that has access to two lines of reset, one per system instance. When one system instance needs to be reset, the other system instance will take over as master for the uniprocessor system.

A multiprocessor, shared memory system as disclosed in co-pending U.S. patent application Ser. No. 08/774548, entitled "Shared Memory Control Algorithm for Mutual Exclusion and Rollback", by Brian Baker and Terry Newell, and incorporated herein by reference, effects certain permanent system changes in "transactions". In this system, multiple processors execute processes that may modify shared memory. Memory changes made by a process executing on a processor do not permanently affect the shared memory until the process successfully completes. During process execution, memory used by a process is "owned" by that process; read and write access by other processes is locked out. If a process does not successfully complete or attempts to access memory owned by another process, the process is aborted and memory affected by the process is "rolled back" to its previous state. Memory changes are only made permanent (or "committed") upon successful process completion. In this context, "transactions" may be considered those intervals between initial system accesses that may ultimately permanently affect the system state, and the "committal" of the state changes to the system. This shared memory system is referred to as a transactional system.

Further, a multiprocessor, shared memory computing system is disclosed in co-pending U.S. patent application Ser. No. 08/997,776, entitled "Computing System having Fault Containment", by Barry Wood et al. and assigned to Northern Telecom Limited, the contents of which are also herein incorporated by reference. The multiprocessor system comprises a plurality of processing element modules, input/output processor modules and shared memory modules interconnected with the processing elements and input/output processors. The modules are interconnected by point to multi-point point communication links. Shared memory is updated and read by exchanging frames forming memory access transactions over these links.

Unfortunately, in the case of these novel multiprocessor, shared memory computing systems, the above described fault recovery and manual reset solution does not work, specifically due to the fact that the reset lines act as single points of failure for the entire system.

The background information provided above clearly shows that there exists a need in the industry to provide an improved method for ensuring the proper functionality of a multiprocessor, shared memory computing system.

SUMMARY OF THE INVENTION

The present invention is directed to fault recovery in a multiprocessor computing system. Such systems typically comprise a plurality of Processing Element (PE) modules, Input/Output Processor (IOP) modules and shared memory modules interconnected with the processing elements and input/output processors.

In a specific example the present invention permits three types of sanity detection These are PE sanity, System sanity, and Scheduler sanity. PE sanity detection includes the ability to detect when a PE has become "locked up" due to hardware or software errors. System sanity detection includes the ability to detect conditions whereby processes are no longer able to work their way through the operating system time queues, onto the ready queue, and finally onto some processor. Scheduler sanity detection includes the ability to detect damage to scheduler data structures, as well as the detection of insane scheduler interrupt code.

In summary, the invention provides a novel PE that features a watchdog timer and a sanity timer. In operation both timers run until a certain limit count is reached. When this event occurs, the timer expires and issues a reset command that causes the PE module to be reset and taken out of service. In order to keep the PE running both timers must be cleared (set to an initial count value) before the limit count is reached.

The watchdog timer is controlled by the scheduler of the operating system. The purpose of the scheduler is to periodically assign PE processing time to different processes. The scheduler itself is a block of operating system code that is run by any one PE in order to effect task switching, in other words, switch from one process to another. The execution of this block of code causes the watchdog timer to be cleared. If the PE has locked-up, the scheduler will not be able to execute properly on the PE and the watchdog timer will reach the limit count that will cause the PE to be reset.

The sanity timer is controlled by a high priority system audit process, referred to as SYSMON. SYSMON is an operating system block of code whose execution is managed by the scheduler as any other utility process that may be run on the computer system at any given time. In a most preferred embodiment, each Field Replaceable Unit (FRU) of the computer system, such as PEs, IOPs and memory modules, includes a sanity timer. When SYSMON is run it causes the generation of an external clear signal for each FRU, where this external clear signal clears the FRU sanity timer. Thus, if SYSMON is not run, all of the sanity timers will expire at very close to the same time and reset their respective modules, resulting in a system-wide reset. SYSMON is useful for protecting against faults where the scheduler may be running properly but processes may not be able to execute in the appropriate manner.

The invention also provides a computer readable storage medium including a program element for execution by a multiprocessor computing system implementing a scheduler capable to clear the watchdog timer of a PE and a process to clear the sanity timer of a PE.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DESCRIPTION OF A PREFERRED EMBODIMENT

Figure 1:
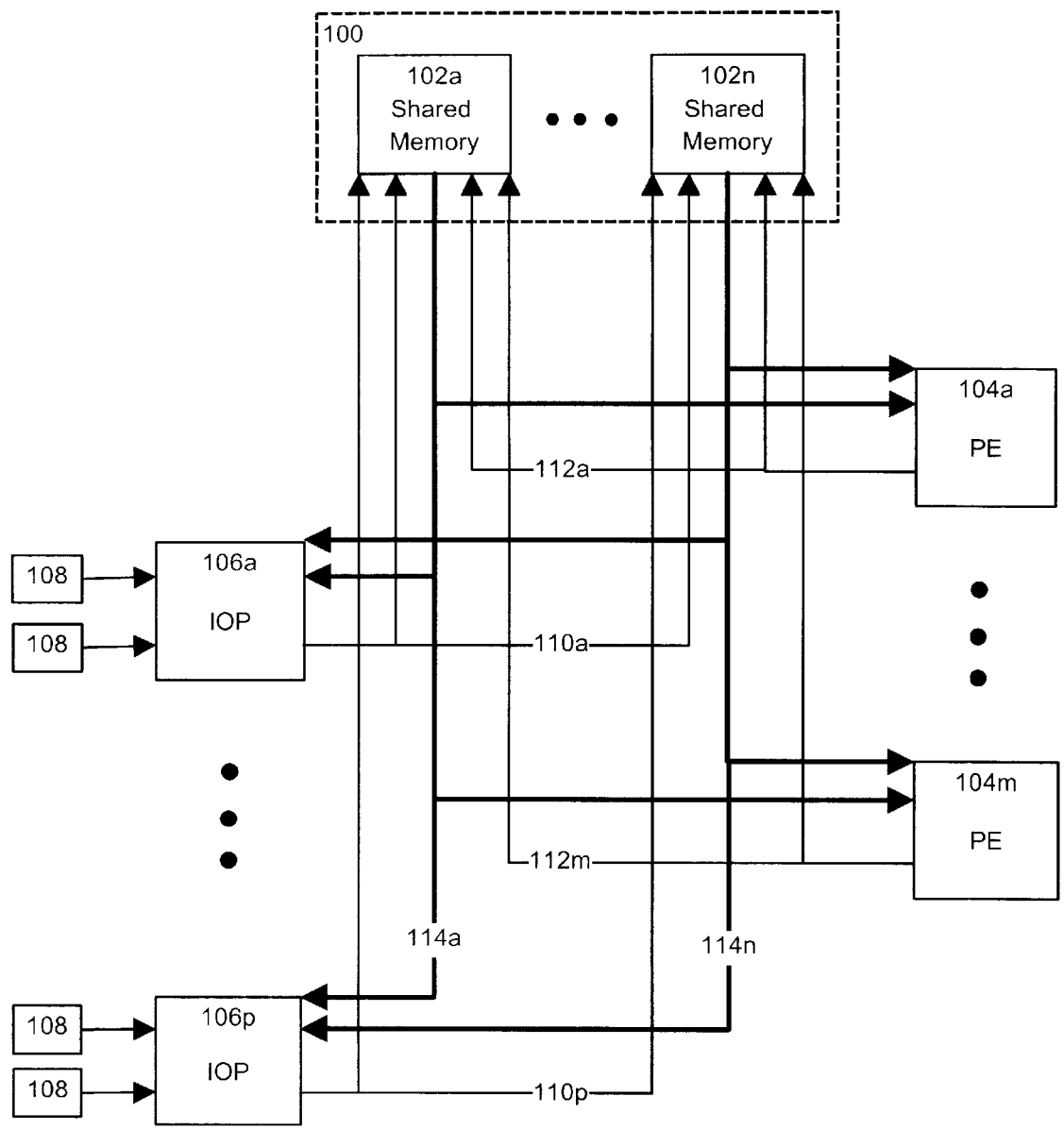
FIG. 1 is a block diagram of a multiprocessor, shared memory computing system, in accordance with an aspect of the present invention.

FIG. 1 illustrates the architecture of a multiprocessor, shared memory computing system in accordance with a preferred embodiment of the present invention. The system comprises shared memory 100, which in turn comprises a plurality of shared memory modules 102a to 102n (collectively and individually referred to as 102). Interconnected with shared memory 100 are a plurality of processing elements (PEs) 104a to 104m (collectively and individually referred to as 104) and a plurality of input/output processors (IOPs) 106a to 106p (collectively and individually referred to as 106). Connected to each IOP 106 is one or more input/output peripherals 108. Such peripherals may include disk and tape storage devices or communications interfaces such as OC3 interfaces.

The architecture of the multiprocessor system shown in FIG. 1 allows scalable processing using one or any other number of PEs 104, up to the limit of physically available slots. The system may be reconfigured simply by inserting a further PE 104. Input/output is similarly scalable and accomplished by inserting more IOPs 106 into the system. Finally, memory of the multiprocessor system is expandable by increasing shared memory 100 by inserting one or more shared memory modules 102 up to the limit of physically available slots, or by increasing the memory capacity of each PE 104 as explained below.

Shared memory 100, PEs 104 and IOPs 106 are interconnected by a set of communication links collectively referred to as an extended architecture interconnect ("XAI"). Physically, the XAI comprises links 110a to 110p (collectively and individually referred to as 110); 112a to 112m (collectively and individually referred to as 112; and 114a to 114n (collectively and individually referred to as 114). These are unidirectional point to multipoint links. Preferably these are serial links.

Each IOP 106 and PE 104 is interconnected with each shared memory module 102 by one of links 110 and 112, respectively. These links allow a serial transfer of data from IOPs 106 to shared memory modules 102 and PEs 104 to shared memory modules 102. Each IOP 106 or PE 102 broadcasts all of its outgoing data on one associated link 110 or 112. Each link 110 or 112 is interconnected with each shared memory module 102. Thus, all data broadcast by a single IOP 106 or PE 104 is received by all shared memory cards 102.

Each shared memory module 102 is further interconnected with each PE 104 and IOP 106 by a serial link 114. Each of these serial links 114 allows a serial transfer of data from a shared memory module 102 to all IOPs 106 and PEs 104.

Data is transferred between PEs 104, IOPs 106 and shared memory modules 102 in frames, on links 110, 112 and 114. Groups of frames are used to complete transactions between modules 104, 106 and 102, as disclosed in U.S. patent application Ser. No. 08/997776.

Figure 2:
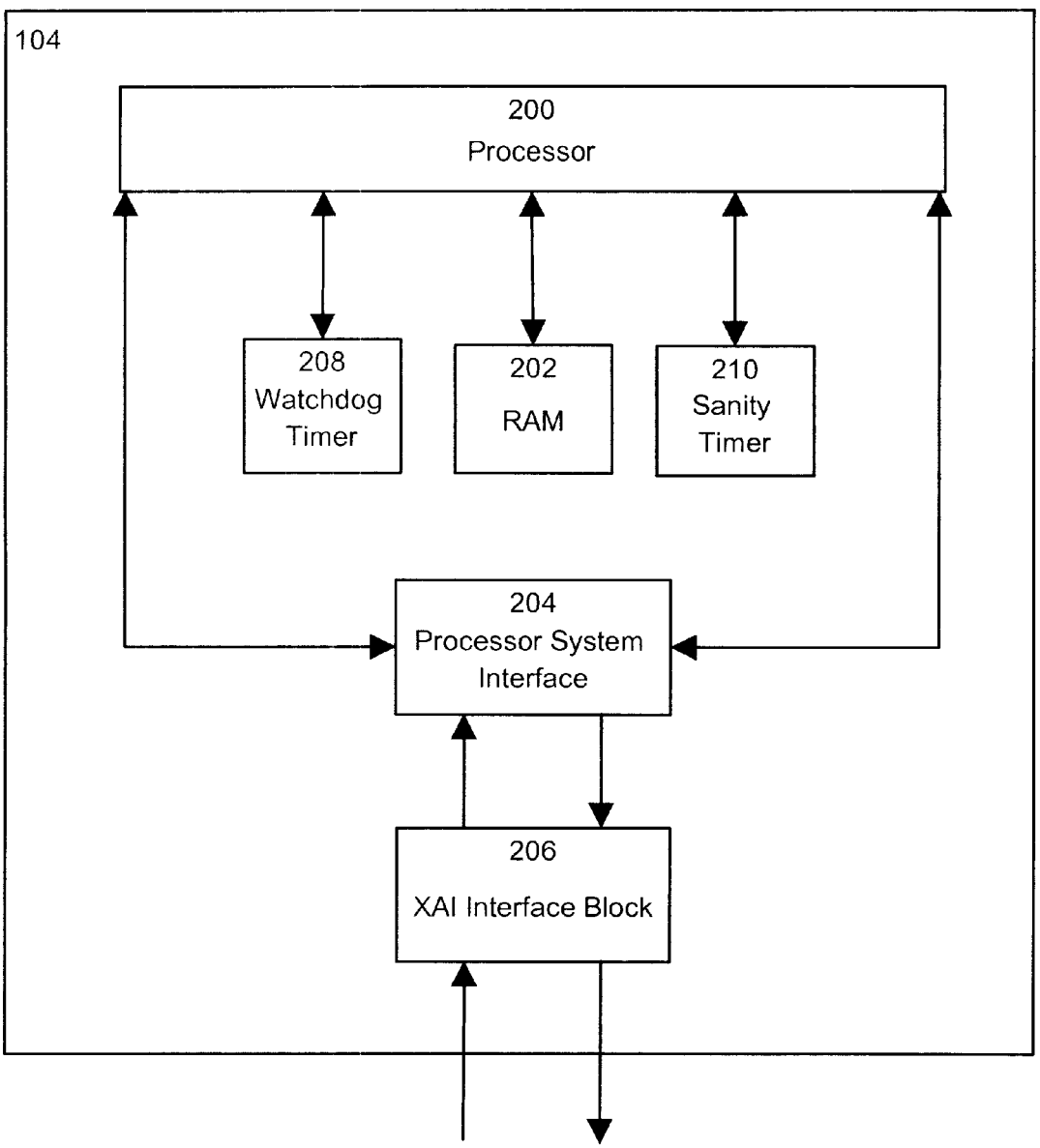
FIG. 2 is a block diagram of a processing element of the system depicted in FIG. 1.

FIG. 2 illustrates the architecture of each PE 104. PEs 104 provide the multiprocessor system with multiple spared, fault detection computing engines, each operating in a symmetric multi-processing environment. Each PE 104 maintains an independent service state during operation so that each PE may be individually replaced or upgraded without the need to replace any other hardware and without causing any other interruption to the system. Each PE 104 comprises a processor block 200. RAM 202 is interconnected with the processor block 200 and provides fast local access by the processor block 200 to a copy of a program used to control the operation of the processor block 200, as well as for overall control of the multiprocessor system shown in FIG. 1.

Additionally, interconnected to processor block 200 is a processor system interface 204, an Application Specific Integrated Circuit (ASIC). The processor system interface 204 acts as a port controller for the processor block 200. This interface 204 provides a plurality of input ports, each of which is physically and logically isolated from the other. These serve as the access points for receipt of data from interconnected modules by the processor system interface 204. Similarly, the interface 204 provides a data output transmit port allowing for the provision of data from the processor block 200 to shared memory 100.

Interconnected with the processor system interface 204 is an XAI interface block 206, providing the physical link between the PE 104 and the XAI, specifically the group of links 110, 112 and 114. Preferably, the XAI interface block 206 is formed from one or more ASICs.

Specific to the present invention, interconnected to processor block 200 are two timers, the watchdog Timer (WT) 208 and the Sanity Timer (ST) 210, both ASICs. These timers are used to implement fault recovery and manual reset within the multiprocessor, shared memory system, as will be described in further detail below.

The architecture of each IOP 106 is not illustrated. Ultimately, each IOP provides a standard PCI interface to the multiprocessor system for interconnection to a PCI bus based peripheral, such as for example a standard serial interface, an optical (OC3) interface, a SCSI hard disk drive, or a DAT drive. Each IOP 106 also comprises a processor system interface and an XAI interface block that are substantially similar to those forming part of PEs 104. Specific to the present invention, each IOP includes a Sanity Timer (ST).

Figure 3:
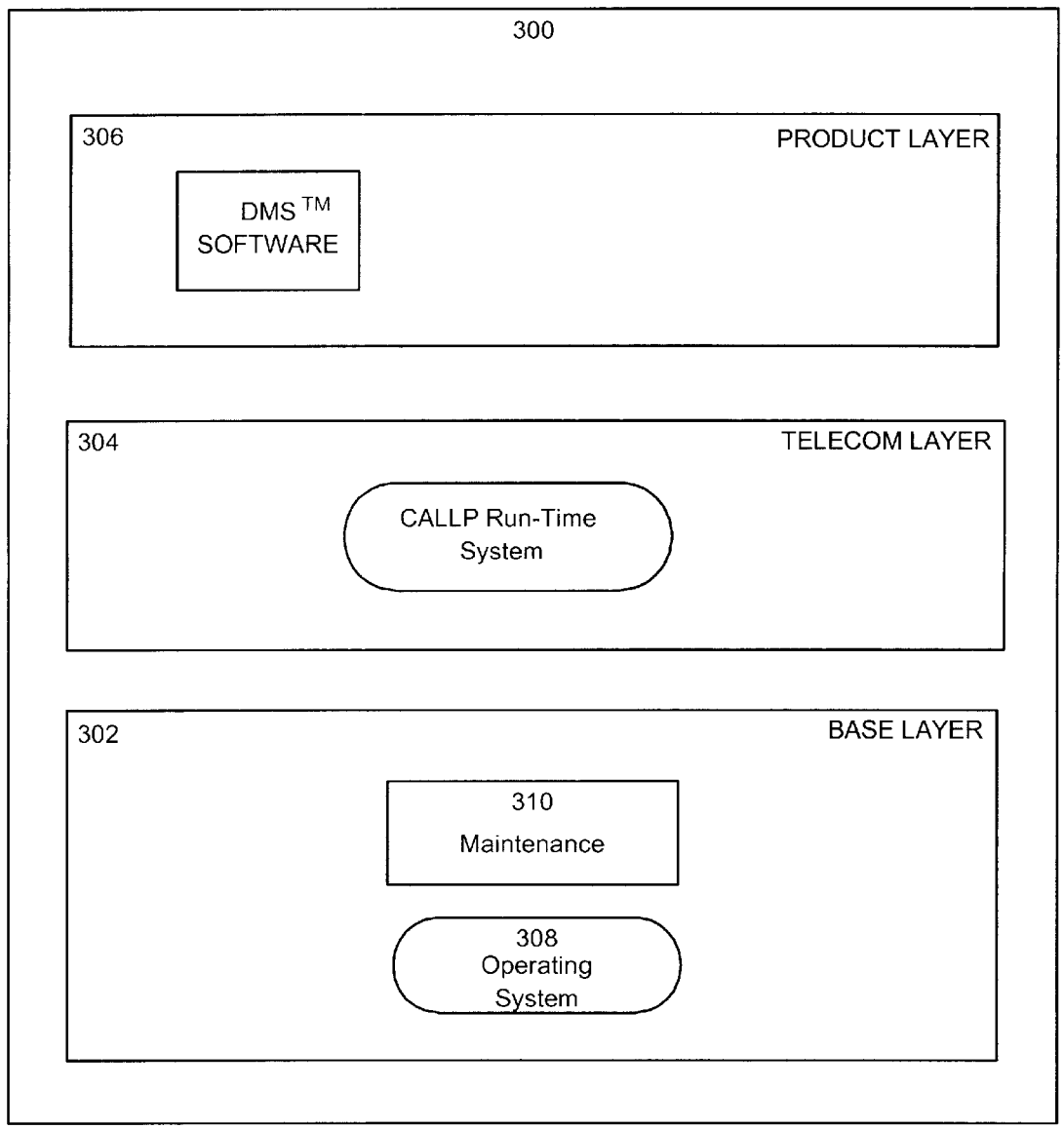
FIG. 3 is a block diagram of the software forming part of the system depicted in FIG. 1.

The architecture of the software used in the multiprocessor, shared memory system shown in FIG. 1 is illustrated in FIG. 3. Specifically, the software system 300 comprises a base layer 302 that interfaces with the hardware of the multiprocessor system and includes an operating system 308 and maintenance software 310 The maintenance software 310 supports the hardware maintenance space, a portion of the microprocessor system address space which is devoted to the access to registers on the module ASICs within the multiprocessor system, where each module has a reserved amount of maintenance space for its own registers. Ultimately, the operating system 308 and maintenance software 310 support the product layer 306 and telecom layer 304, that allow the multiprocessor to act as, in this example, a telecommunications switch.

Identical copies of the program portion of software system 300 are stored in RAM 202 of each PE 104. Simultaneously running copies of the program portion of the software system arbitrate overall system co-ordination and scheduling of processing using shared memory 102.

A PE 104 is considered to be sane when it is regularly scheduling processes. Thus, PE sanity entails ensuring that processes are being scheduled within a set time. If at least one PE 104 is sane, then the multiprocessor system is sane. This means that system sanity involves ensuring that at least one PE 104 is productively involved in scheduling processes. Since sanity detection requires correct functioning of the operating system 308 scheduler, the scheduler should be able to detect and repair insane conditions within the scheduler itself, without triggering harsh system sanity correction procedures. The purpose of the scheduler is to periodically assign PE processing time to different processes. The scheduler itself is a block of operating system code that is run by any one PE in order to effect task switching, in other words, switch from one process to another.

The present invention provides for three major types of sanity detection in the symmetric multiprocessor system shown in FIG. 1. These are PE sanity, System sanity, and Scheduler sanity. PE sanity detection includes the ability to detect when an individual PE 104 has become "locked up" due to hardware or software errors. System sanity detection includes the ability to detect when a peer PE 104 has become insane as well as when the system as a whole has become insane, the latter comprising the ability to detect conditions whereby processes are no longer able to work their way through the operating system 308 time queues, onto the ready queue, and finally onto some processor. Scheduler sanity detection includes the ability to detect damage to scheduler operation, as well as the detection of insane scheduler interrupt code.

1.0 PE Sanity

A PE 104 is sane if the hardware and software within the PE 104 allow processes to advance through the symmetric operating system 308 time queues, into the ready queues and then be run. Therefore, an implementation which allows a PE 104 to remain in service only if the above operations are happening by definition ensures that only sane PEs 104 will be a part of the system.

The watchdog Timer (WT) 208 is a timer implemented on each PE 104 and handled by the operating system 308 scheduler. The timer runs until a certain predetermined limit count is reached, at which point it expires and issues a reset command that causes the PE 104 to be reset. In order to keep the PE running the timer must be cleared (set to an initial count value) before the limit count is reached. The WT 208 of PE 104 is cleared by the scheduler before it starts a process running on the PE 104, and is configured to expire after a time period slightly longer than the maximum time that the scheduler has not run. Thus, if this timer reaches its limit count and expires, it means that the scheduler has not been run on the PE 104 for far too long, and the PE 104 is reset and taken out of service. Fault handling software is notified of the PE 104 reset and is responsible for recovering the transaction that was in progress at the time the PE 104 was reset A status register in the PEs 104 maintenance space is cleared to indicate that the PE 104 is no longer executing software. Therefore, it is certain on an individual PE basis that the scheduler is running regularly, and that if the scheduler does not run regularly the PE will be taken out of service.

PE hardware sanity checking is designed to detect situations where a PE 104 is insane due to hardware faults which prevent software from running. Thus, PE hardware sanity checking requires that the hardware be sane enough to run software. The above described WT 208 acts as the hardware sanity timer. Upon detection of a potential PE 104 hardware fault, that PE 104 must be removed from the system. All processes currently running on that PE 104 are rolled back, as disclosed in U.S. patent application Ser. No. 08/774,548. The PE 104 gets controlled access to the shared system in order to allow system recovery actions.

2.0 System Sanity

The ability of individual PEs 104 to run the scheduler does not guarantee that the multiprocessor system as a whole is sane. The system is sane if processes can advance through the operating system 308 time queues, onto the ready queues, and be executed successfully on a PE 104. If the system does not demonstrate this behavior on a regular basis then this fact must be detected and the system recovered through a restart or a reboot.

System sanity ensures that at least one PE 104 and shared memory module 102 are sane. To that end, each Field Replaceable Unit (FRU) in the multiprocessor system, specifically each PE 104, each memory module 102 and each IOP 106, is provided with an identical period global Sanity Timer (ST) 210 in their maintenance space. As in the case of the WT, the ST runs until a certain predetermined limit count is reached. In order to keep the PE running the ST must be cleared (set to an initial count value) before the limit count is reached and the timer expires. If the global ST is not cleared before it expires, the cards (also referred to as modules) are reset. The global STs are cleared by a high priority system audit process known as SYSMON that waits on a timer queue, becomes ready, and then must be run. Note that this process is a program element stored in the multiprocessor system shared memory 102 and may be run on any PE 104. When SYSMON is run it causes the generation of an external clear signal for each FRU of the system (e.g. IOPs, PEs and memory modules). Each external clear signal, sent to a particular FRU, accesses a specific address in the maintenance space of the FRU, thus clearing the FRU sanity timer. If SYSMON is not run then all the global STs will expire at very close to the same time and reset their respective cards, resulting in a system-wide reset. The term "global" is used because the plurality of STs expire at around the same time, resulting in a system-wide (global) reset.

Therefore, the system must periodically demonstrate that processes can be progressed through the time queues, onto the ready queues, and be executed successfully on at least one PE. 104 If the system does not do so, then system recovery is initiated. Specifically, access to the RAM/IO space on each shared memory card 102 is disabled and the card begins to listen to all possible sources. The PEs 104 and IOPs 106 are reset, and begin to listen to all ports.

Note that the system hardware is independently testable in a running system, that system sanity is dependent upon both software and hardware operation, and that no human intervention is required to detect an insane load. Furthermore, the simultaneous timeout of all the STs has the effect of being a global system reset.

3.0 Scheduler Operation Sanity

Scheduler operation sanity is concerned with ensuring that processes are capable of running through the operating system 308 time queues, and eventually getting CPU time. This sanity check ensures that system sanity failures are not caused by scheduler data structure failures which can be fixed by less drastic measures.

In order to simplify this sanity check, the operation of the scheduler is verified through the use of the PE 104 and shared system sanity processes. Specifically, no scheduler operation sanity is required. If scheduler data structures are corrupt, then system-wide resets are run. Note that no processes are lost during the rebuilding of scheduler data structures.

While the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

We claim:

1. A processing element for use in a multiprocessor computing system, said processing element including:

a processor block;

an input port for receiving instruction elements for execution by said processor block;

a watchdog timer in operative relationship with said processor block, said watchdog timer capable to cause said processor block to reset after a first predetermined time interval has elapsed from setting the watchdog timer in a first initial condition;

a sanity timer in operative relationship with said processor block, said sanity timer capable to cause said processor block to reset after a second predetermined time interval has elapsed from setting the sanity timer in a second initial condition;

said processor block being responsive to the presence of at least one predetermined executable instruction element to cause said watchdog timer to acquire the first initial condition;

said processing element being responsive to an external signal to cause said sanity timer to acquire the second initial condition.

2. The processing element as defined in claim 1, wherein said first and second time intervals have different durations.

3. The processing element as defined in claim 2, wherein said watchdog timer includes a counter.

4. The processing element as defined in claim 2, wherein said sanity timer includes a counter.

5. The processing element as defined in claim 1, wherein said at least one predetermined executable instruction is part of a scheduler of an operating system.

6. The processing element as defined in claim 1, wherein the external signal is generated in response to execution of a program element part of an operating system.

7. A multiprocessor computing system comprising:

a plurality of processing elements, each processing element including:

a. a processor block;

b. an input port for receiving instruction elements for execution by said processor block;

c. a watchdog timer in operative relationship with said processor block, said watchdog timer capable to cause said processor block to reset after a first predetermined time interval has elapsed from setting the watchdog timer in a first initial condition;

d. a sanity timer in operative relationship with said processor block, said sanity timer capable to cause said processor block to reset after a second predetermined time interval has elapsed from setting the sanity timer in a second initial condition;

e. said processor block being responsive to the presence of at least one predetermined executable instruction element to cause said watchdog timer to acquire the first initial condition;

f. said processing element being responsive to an external signal to cause said sanity timer to acquire the second initial condition.

8. The multiprocessor computing system as defined in claim 7, wherein said first and second time intervals have different durations.

9. The multiprocessor computing system as defined in claim 8, wherein said watchdog timer includes a counter.

10. The multiprocessor computing system as defined in claim 8, wherein said sanity timer includes a counter.

11. The multiprocessor computing system as defined in claim 7, wherein said at least one predetermined executable instruction is part of a scheduler of an operating system.

12. A multiprocessor computing system as defined an claim 7, wherein the external signal is generated in response to execution of a program element part of an operating system.

13. A computer readable storage medium including a program element for execution by a multiprocessor computer system to implement an operating system, the multiprocessor computer system including a plurality of processing elements, each processing element including a watchdog timer and a sanity timer, said operating system including:

a scheduler for scheduling execution of processes by the computer system, said scheduler including at least one executable instruction to cause resetting of the watchdog timer of one of the plurality of processing elements of the computer system;

a system audit process that when executed by one of the plurality of processing elements of the computer system causes generation of at least one signal to cause resetting of the sanity timer of each one of the plurality of processing elements of the computer system.

14. A processing element for use in a multiprocessor computing system, said processing element including:

processing means;

input means for receiving instruction elements for execution by said processing means;

a watchdog timer means in operative relationship with said processing means, said watchdog timer means capable to cause said processing means to reset after a first predetermined time interval has elapsed from setting the watchdog timer means in a first initial condition;

a sanity timer means in operatives relationship with said processing means, said sanity timer means capable to cause said processing means to reset after a second predetermined time interval has elapsed from setting the sanity timer means in a second initial condition;

said processing means being responsive to the presence of at least one predetermined executable instruction element to cause said watchdog timer means to acquire the first initial condition;

said processing element being responsive to an external signal to cause said sanity timer means to acquire the second initial condition.

15. A method for preventing a processing element of a multiprocessor computer system from being reset, said processing element comprising:

a processor block;

an input port for receiving instruction elements for execution by said processor block;

a watchdog timer in operative relationship with said processor block, said watchdog timer capable to cause said processor block to reset after a first predetermined time interval has elapsed from setting the watchdog timer in a first initial condition;

a sanity timer in operative relationship with said processor block, said sanity timer capable to cause said processor block to reset after a second predetermined time interval has elapsed from setting the sanity timer in a second initial condition;

said method comprising the steps of:

a. executing by said processor block at least one instruction that causes said watchdog timer to acquire the first initial condition, repeatedly at a rate selected to prevent the watchdog timer from resetting said processing element;

b. supplying an external signal to said processing element to cause said sanity timer to acquire the second initial condition, repeatedly at a rate selected to prevent the sanity timer from resetting said processing element.

* * * * *